US008301329B2

(12) United States Patent
Andreasen et al.

(10) Patent No.: US 8,301,329 B2
(45) Date of Patent: Oct. 30, 2012

(54) SCAN TOOL USER INTERFACE

(75) Inventors: Keith Andreasen, Huntington Beach, CA (US); David S Rich, II, Huntington Beach, CA (US)

(73) Assignee: Innova Electronics, Inc., Irvince, CA (US)

( * ) Notice: Subject to any disclaimer, the term of this patent is extended or adjusted under 35 U.S.C. 154(b) by 1022 days.

(21) Appl. No.: 12/165,421

(22) Filed: Jun. 30, 2008

(65) Prior Publication Data

US 2009/0326757 A1 Dec. 31, 2009

Related U.S. Application Data

(63) Continuation of application No. 10/898,268, filed on Jul. 22, 2004, now Pat. No. 7,437,227.

(51) Int. Cl.

| | |
|---|---|
| ***G01M 17/00*** | (2006.01) |
| ***G06F 7/00*** | (2006.01) |
| ***G06F 11/30*** | (2006.01) |
| ***G06F 11/32*** | (2006.01) |
| ***G07C 5/00*** | (2006.01) |
| ***G07C 5/08*** | (2006.01) |

(52) U.S. Cl. ..................... 701/29.1; 701/31.7; 701/33.2; 340/438

(58) Field of Classification Search ................ 701/1, 29, 701/30, 31, 32, 33, 34, 35, 29.1, 29.6, 30.3, 701/31.4, 31.5, 31.7, 31.8, 32.7, 33.2, 29.2, 701/29.7; 340/425.5, 438, 439; 307/9.1, 307/10.1

See application file for complete search history.

(56) References Cited

U.S. PATENT DOCUMENTS 2,960,654 A 11/1960 Nelson
3,646,438 A 2/1972 Staff
4,176,315 A 11/1979 Sunnarborg
4,207,611 A 6/1980 Gordon
4,404,639 A 9/1983 McGuire et al.
4,859,932 A 8/1989 Whitley
4,884,033 A 11/1989 McConchie, Sr.
5,003,478 A 3/1991 Kobayashi et al.
5,157,708 A 10/1992 Garthwaite et al.
5,214,582 A 5/1993 Gray
5,247,245 A 9/1993 Nelson
5,278,508 A 1/1994 Bowman
5,285,163 A 2/1994 Liotta
5,359,290 A 10/1994 Cervas
5,394,093 A 2/1995 Cervas
5,400,018 A 3/1995 Scholl et al.
5,481,906 A 1/1996 Nagayoshi et al.
5,491,418 A 2/1996 Alfaro et al.
5,506,772 A 4/1996 Kumozono et al.
5,541,840 A 7/1996 Gurne et al.
5,657,233 A 8/1997 Cherrington et al.
5,758,300 A 5/1998 Abe
5,916,286 A 6/1999 Seashore et al.
6,021,366 A 2/2000 Fieramosca et al.
(Continued)

*Primary Examiner* — Thomas Tarcza
*Assistant Examiner* — Edward Pipala
(74) *Attorney, Agent, or Firm* — Stetina Brunda Garred & Brucker

(57) ABSTRACT

A scan tool is provided which comprises a housing which houses a display and six mode buttons. The scan tool is communicable with an OBD of an automobile and provides information retrieved therefrom to a user of the scan tool in an efficient and effective manner. In particular, the display displays a plurality of information on one screen. For example, the display may display information related to I/M Monitor Status simultaneously with MIL status, stored, pending or historical codes. Further, the scan tool allows the user to switch between modes by depressing the mode button of the desired mode without having to manually exit the current mode and manually enter the desired mode.

36 Claims, 9 Drawing Sheets

U.S. PATENT DOCUMENTS 6,097,998 A 8/2000 Lancki
6,141,608 A 10/2000 Rother
6,225,898 B1 5/2001 Kamiya et al.
6,263,265 B1 7/2001 Fera
6,295,492 B1 9/2001 Lang et al.
6,314,422 B1 11/2001 Barker et al.
6,330,499 B1 12/2001 Chou et al.
6,370,454 B1 4/2002 Moore
6,535,802 B1 3/2003 Kramer
6,687,584 B2 2/2004 Andreasen et al.
6,738,696 B2 5/2004 Oi
2002/0193925 A1 12/2002 Funkhouser et al.
2003/0060953 A1 3/2003 Chen
2004/0016804 A1 1/2004 Namaky et al.

| IGNITION STATUS | DTC STATUS | MIL STATUS | I\M STATUS | LED STATUS |
|---|---|---|---|---|
| KOEO | NONE | OFF | COMPLETE | GREEN |
| KOEO | NNE | ON | COMPLETE | GREEN |
| KOER | NONE | OFF | COMPLETE | GREEN |
| KOEO | STORED | ON | COMPLETE | RED |
| KOEO | STORED | ON | NOT COMPLETE | RED |
| KOER | STORED | ON | COMPLETE | RED |
| KOER | STORED | ON | NOT COMPLETE | RED |
| KOEO | NONE | OFF | NOT COMPLETE | YELLOW |
| KOEO | NONE | ON | NOT COMPLETE | YELLOW |
| KOEO | PENDING | OFF | COMPLETE | YELLOW |
| KOEO | PENDING | OFF | NOT COMPLETE | YELLOW |
| KOEO | STORED | OFF | COMPLETE | YELLOW |
| KOEO | STORED | OFF | NOT COMPLETE | YELLOW |
| KOER | NONE | OFF | NOT COMPLETE | YELLOW |
| KOER | PENDING | OFF | NOT COMPLETE | YELLOW |
| KOER | PENDING | OFF | COMPLETE | YELLOW |
| KOER | STORED | OFF | COMPLETE | YELLOW |
| KOER | STORED | OFF | NOT COMPLETE | YELLOW |

*Fig. 9*

SCAN TOOL USER INTERFACE

CROSS-REFERENCE TO RELATED APPLICATIONS

This application is a continuation of prior application Ser. No. 10/898,268, filed Jul. 22, 2004 now U.S. Pat. No. 7,437,227.

STATEMENT RE: FEDERALLY SPONSORED RESEARCH/DEVELOPMENT

Not Applicable

BACKGROUND OF THE INVENTION

The present invention relates to a tool that interfaces with a vehicle's computer, and more particularly to a tool which communicates with an on board diagnostic computer (i.e., OBD), displays a plurality of relevant information on one screen, allows switching between modes with a push of a single button, and reduces the number of user intervention to accomplish a function of the tool.

Prior art scan tools that communicate with the OBD are available in the marketplace. For example, there is the scan tool manufactured by Kal-Equip which is a division of Actron Manufacturing Company and the EZ-SCAN scanner from AUTO-XRAY. In this regard, the these scan tools are capable of linking with the vehicle's computer through a connector typically located at the footwell on the driver's side. However, these prior art scan tools are cumbersome and inefficiently interfaces with the user.

For example, the prior art scan tools including those mentioned above generally comprise a menu. The menu provides the user an option to enter a variety of sub-menus. At which point, the user must enter lower layers of submenus to locate a desired submenu. For example, FIG. 1 illustrates a flow chart of one of the prior art scan tools. The flow chart illustrates the steps required to display Diagnostic Trouble Codes and Pending Codes. In FIG. 1, the first step to view the pending codes or trouble codes is to scan the vehicle. Second, the user must select "DATA" from a list of choices (i.e., monitor or data). Third, the user must select "Trouble Codes" from a list of choices (i.e., 1) Trouble Codes, 2) Operational Data, 3) Customize Data, 4) Clear Codes, and 5) Freeze Frame). Fourth, user must select "ENTER" to display the Trouble Codes Menu which provides choices to display Trouble Codes or Pending Codes. At this point, the user may select between viewing only Trouble Codes or only Pending Codes but not both at the same time. As can be seen from this example, the user must proceed through numerous submenus to display pending codes. Once the user views pending codes, the user must back out from viewing the pending codes to view the trouble codes and cannot view the trouble codes and the pending codes at the same time.

Moreover, to change to a different sub menu such as viewing Readiness Tests (i.e., monitor status), the user must exit out from the sub menu related to viewing trouble codes to step 2 above (i.e., choose between monitor and data). Thereafter, the user must choose "Monitor" then Readiness Test. In other words, this illustrates that in the prior art scan tools, the tool requires that the user manually exit out of a sub menu (e.g., viewing pending codes) prior to entering a different sub menu (e.g., readiness tests).

In summary, by way of example and not limitation, prior art scan tools have the following deficiencies: first, the prior art scan tools do not display all of the relevant information (e.g., pending codes, trouble codes and monitor status as well as other information to be discussed below) on one display; second, prior art scan tools require the user to manually exit out of a sub menu then manually enter into a different sub menu; and third, prior art scan tools require the user to proceed through a plurality of layers of sub menus prior to viewing the relevant information (e.g., pending codes).

BRIEF SUMMARY OF THE INVENTION

The disadvantages in the prior art listed above have been overcome by the present invention. Accordingly, the present invention is related to a scan tool which efficiently and effectively interfaces with the user of the scan tool.

As a preliminary matter, the tool of the present invention communicates with a vehicle's computer such as an on board diagnostic computer (OBD). In this regard, this specification shall refer to various types of information or operating condition of the vehicle located at different PIDs of the OBD, and such information may be referred to as diagnostic information or information items. Moreover, diagnostic information may also relate to calculated results which is a result based on various information located at different PIDS such as calculated load.

The scan tool of the present invention comprises a display, a set of mode buttons and an electrically active component to accomplish respective functions of the different modes. The display displays a plurality of relevant information on one screen. For example, the display may display information related to pending codes, diagnostic trouble codes, monitor status as well as other types of information, as will be discussed in detail in the section titled "DETAILED DESCRIPTION OF THE INVENTION" on a single screen.

Further, once the scan tool has identified the year/make/model/engine of the vehicle, the user is allowed to choose between six modes (i.e., erase vehicle data mode, display DTC mode, display Freeze Frame data mode, activate system test mode, display enhanced mode, and display live data) by depressing a corresponding button on the face of the tool. Once a mode button is depressed, the user is provided with a plurality of information related to that mode and other types of information such as monitor status and MIL status. For example, once the user depresses the display DTC key, the user is provided with pending codes, diagnostic trouble code, and historical codes. Additionally, along with the information on the various codes, the user is always provided information related to I/M Monitor Status, MIL status and other information located at the top of the display through the display of indicators.

Once the user enters a particular mode, the user merely presses a different mode button to both exit the current mode and enter the desired mode. In the present invention, the user is not required to manually exit the current mode then manually enter the desired mode.

Other exemplary embodiments and advantages of the present invention may be ascertained by reviewing the present disclosure and the accompanying drawings.

BRIEF DESCRIPTION OF THE DRAWINGS

An illustrative and presently preferred embodiment of the invention is shown in the accompanying drawings in which:

FIG. 9 is a table of ignition status (i.e. key on/off and engine off/running), DTC status (i.e. none/stored/pending), MIL status (i.e. on/off) and I/M status (i.e. complete/incomplete) which collectively determines which one of the three LEDs shown in FIG. 8 is to be illuminated.

DETAILED DESCRIPTION OF THE INVENTION

Figure 1A:
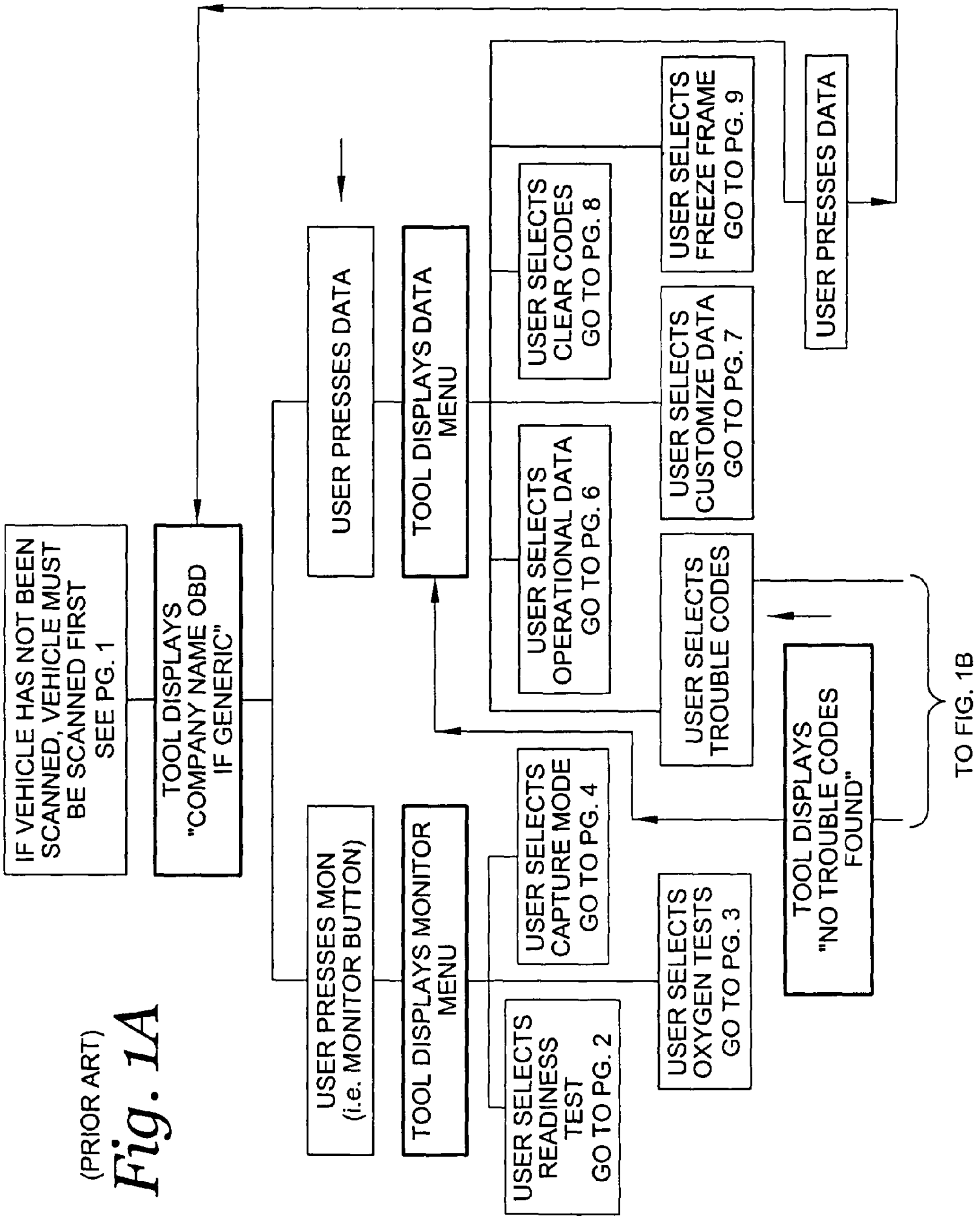
(PRIOR ART) Fig. 1A
FIG. 1 is flow chart of a prior art scan tool which illustrates the number of user intervention to obtain desired information.
Figure 1B:
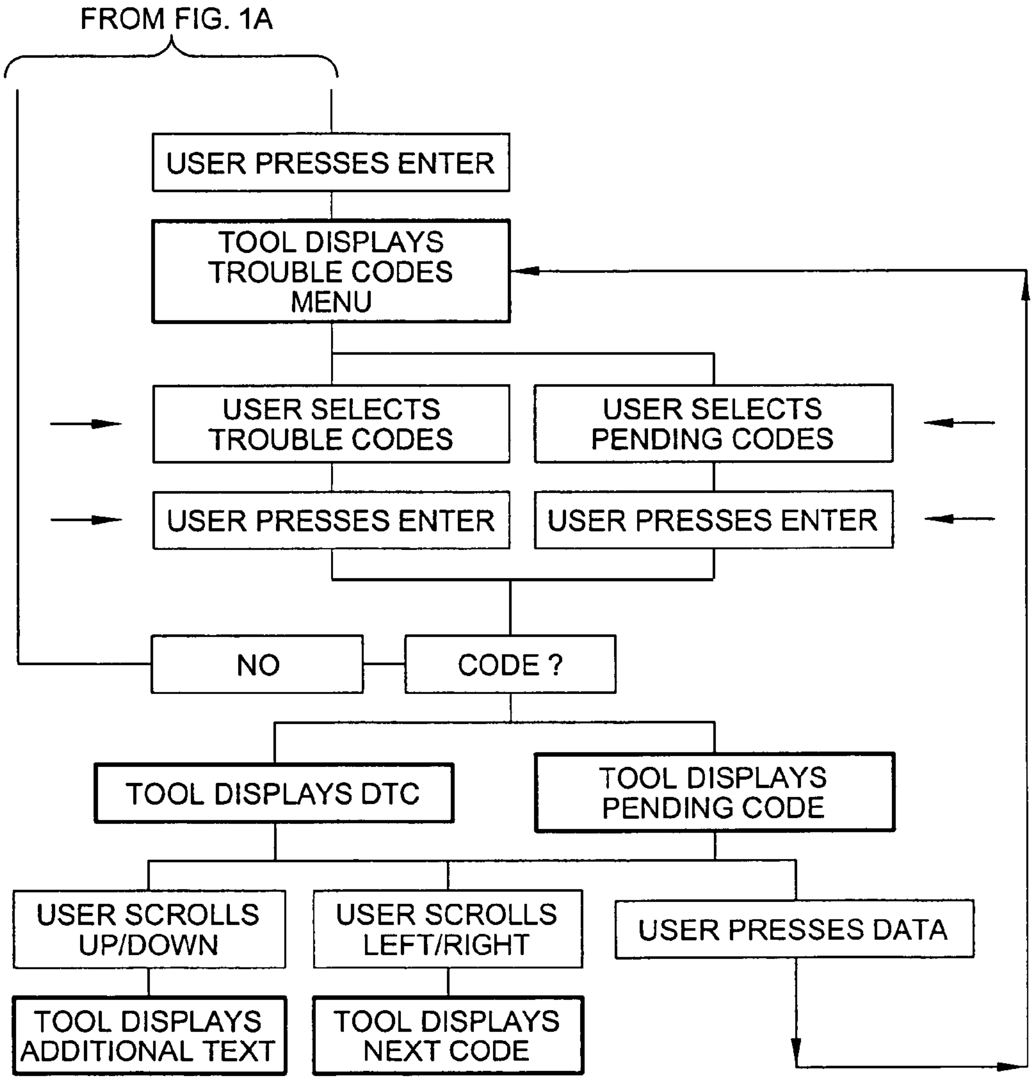
(PRIOR ART) Fig. 1B
Figure 2:
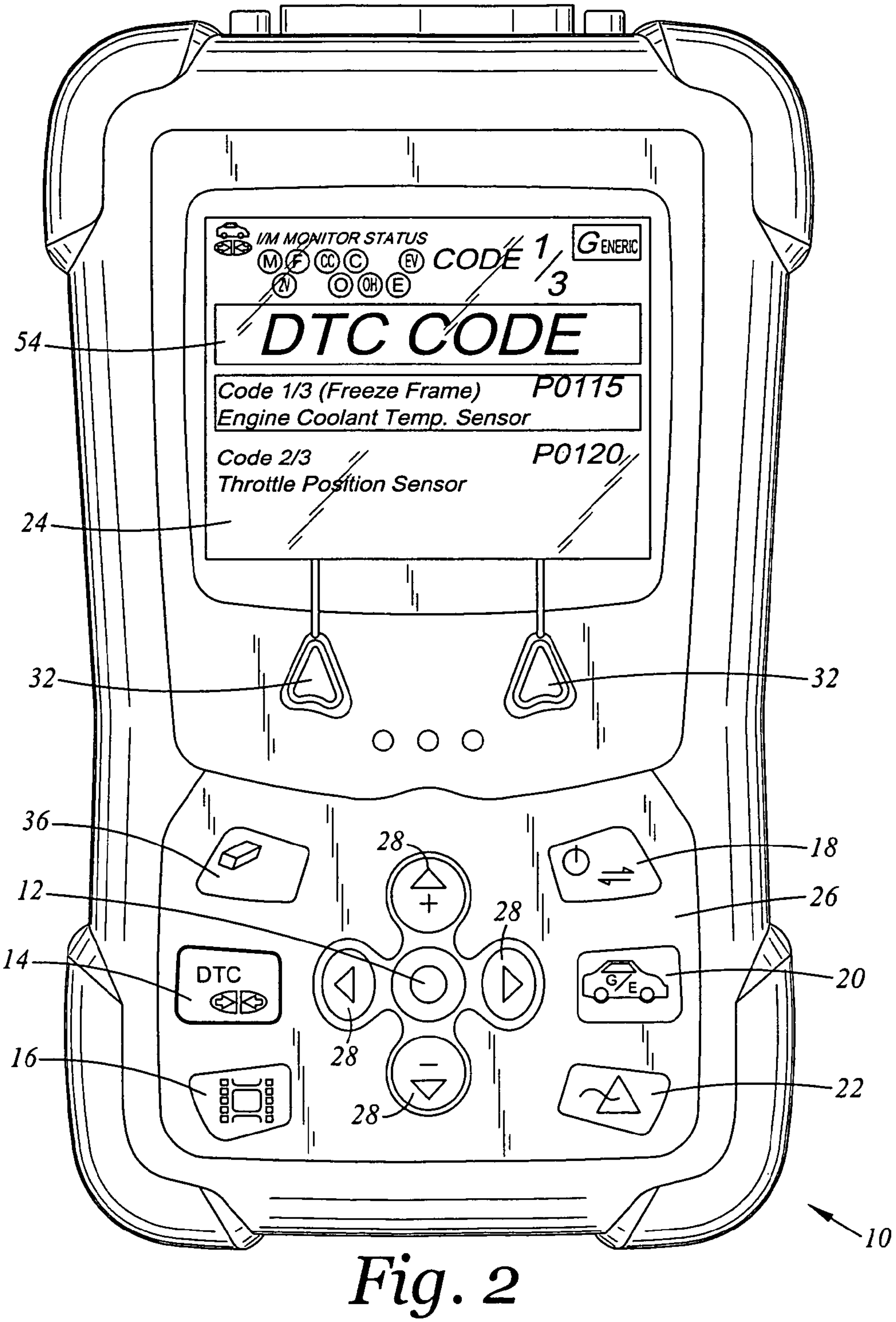
FIG. 2 is a front view of the present invention, namely a tool illustrating a plurality of information on one screen of a display of the tool.

The drawings shown herein are for the purposes of illustrating the preferred embodiments of the present invention and are not meant to limit in any respect the various aspects of the present invention described in this specification. For example, FIG. 2 illustrate a scan tool 10 with six buttons 12, 14, 16, 18, 20, 22 which may be depressed, namely the erase button 12, display DTC button 14, display freeze frame data button 16, activate system tests button 18, display enhanced mode button 20 and the display live data button 22. In the alternative, these buttons 12, 14, 16, 18, 20, 22 may be eliminated and icons may be programmed onto a touch sensitive display 24 such that touching a particular icon is operative to perform the same function as depressing a corresponding button.

The present invention provides a tool 10 which is capable of communicating with an OBD (not shown). And, this tool 10 has an efficient and effective user interface such that the user (e.g., automobile mechanic) does not have to wait for unduly lengthy periods of time while the tool 10 displays relevant information obtained from the OBD or sends information to the OBD. Moreover, the tool 10 is capable of performing different functions such as erase information and display information. In this regard, the tool 10 allows the user to exit out of a function (i.e., mode) and enter a different function (i.e., mode) with a single step, as will be discussed further below.

Figure 4:
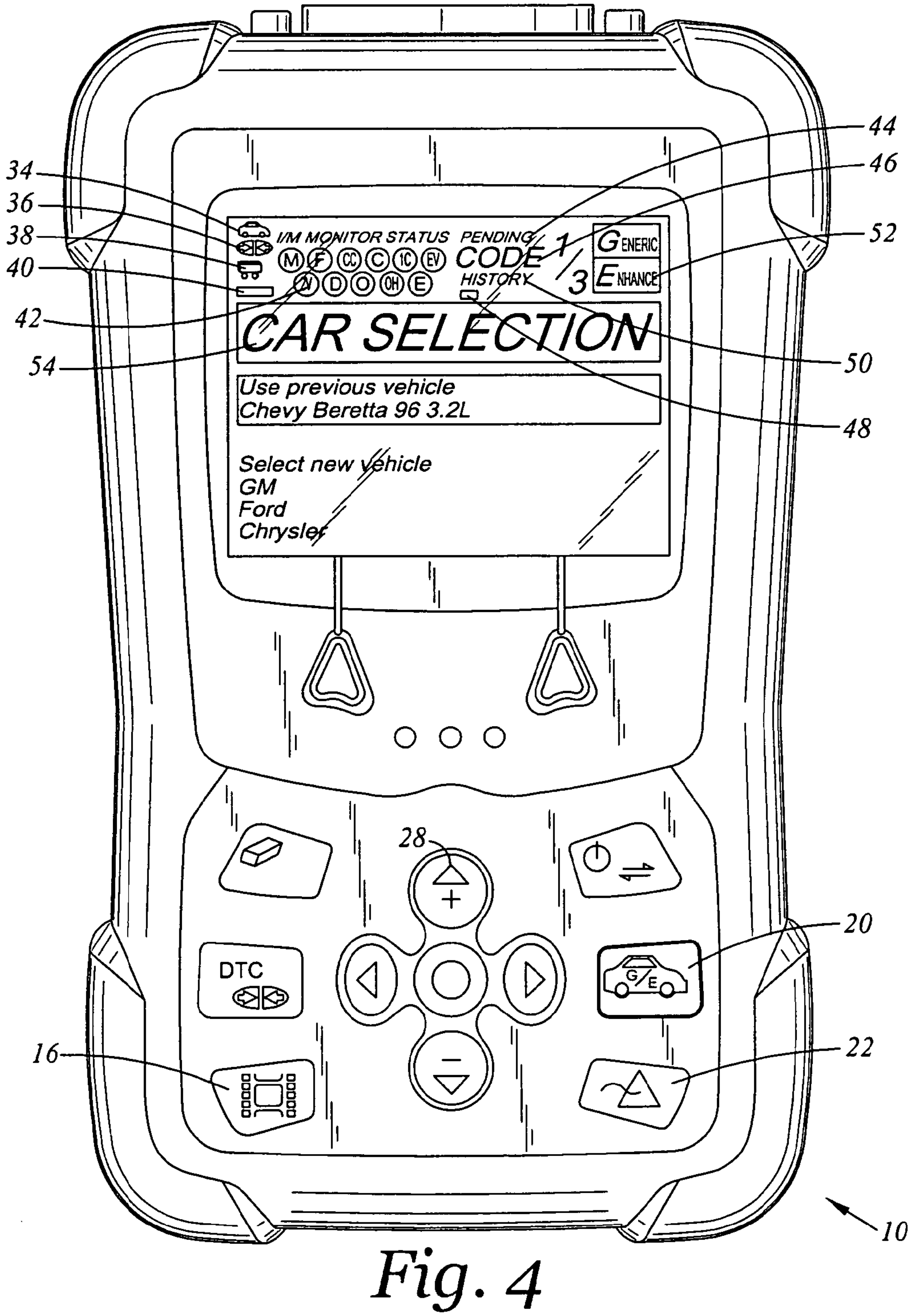
FIG. 4 is a front view of the present invention, namely the tool illustrating information shown on the display when the display enhanced mode button is depressed.
Figure 5:
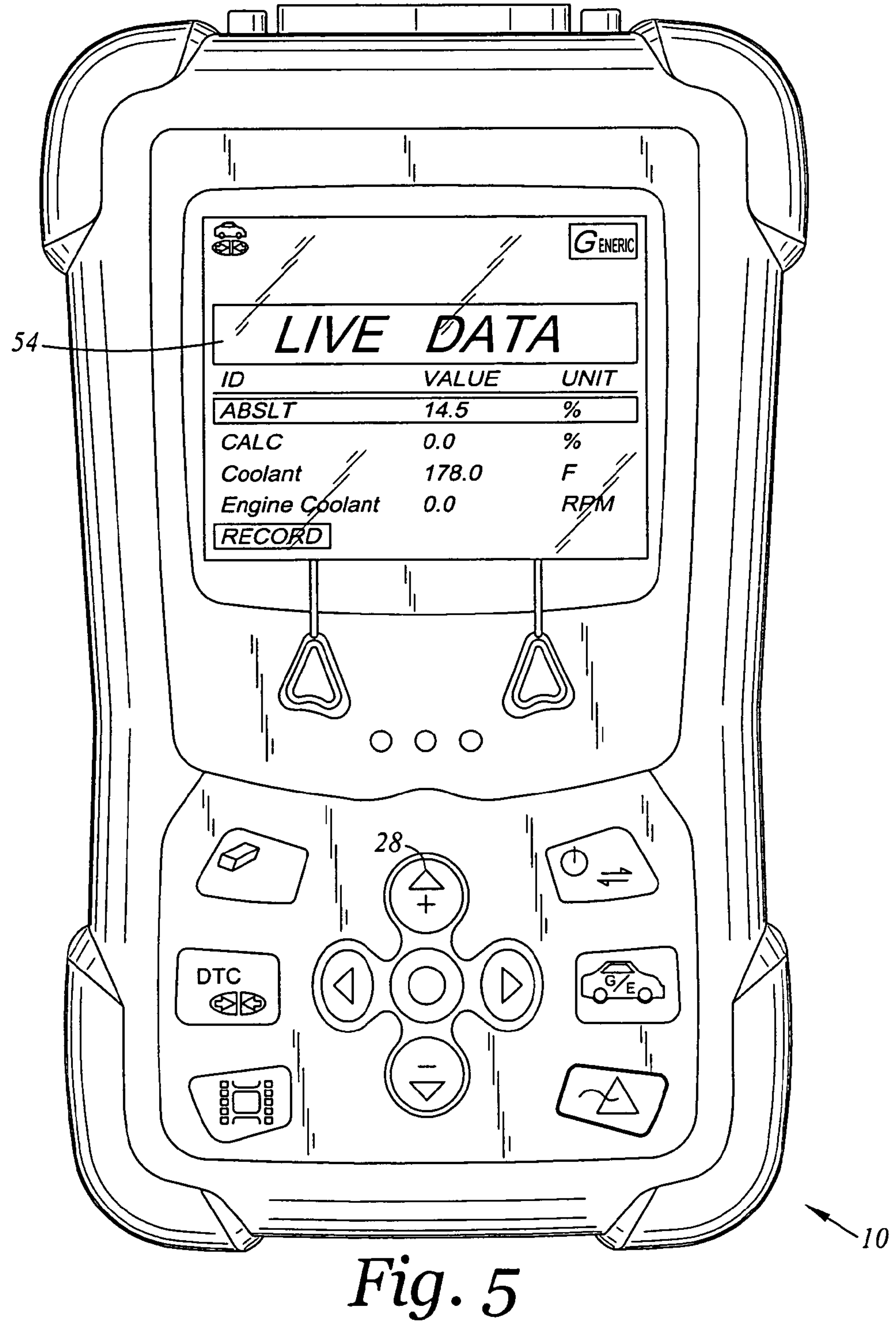
FIG. 5 is a front view of the present invention, namely the tool illustrating information shown on the display when the display Live Data button is depressed.
Figure 6:
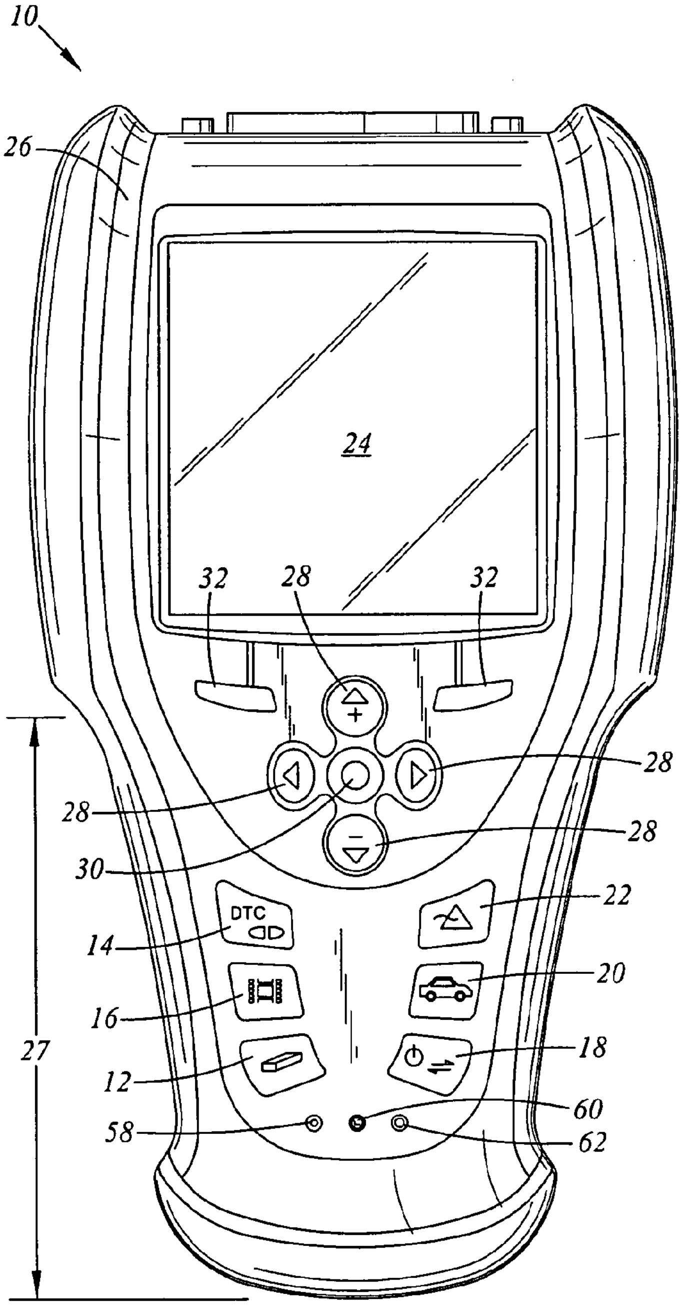
FIG. 6 is a front view of the present invention illustrating a housing with a hand sized grip portion.
Figure 7:
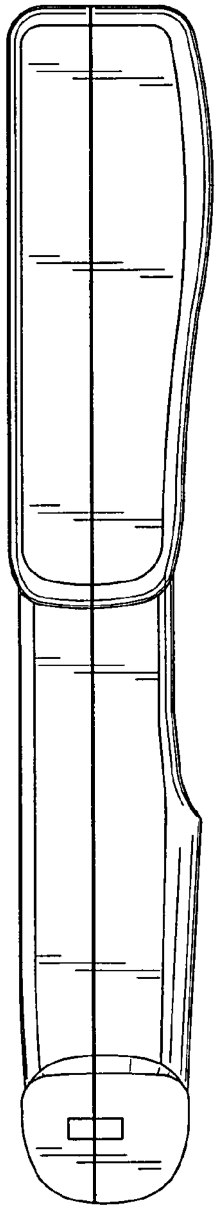
FIG. 7 is a side view of FIG. 6.

A physical embodiment of the tool 10 is shown in FIGS. 2-7. In particular, FIG. 2 illustrates a housing 26 which has a substantially rectangular configuration. And, in contrast, FIG. 6 illustrates a housing 26 which has a smaller hand sized grip portion 27 such that the user may more easily grasp the tool 10 during use. Further, FIG. 7 is a side view of FIG. 6. Despite these differences, the tools 10 shown in FIGS. 2 and 6 both have the housing 26, the display 24, six functions buttons 12, 14, 16, 18, 20, 22, up and down scroll buttons 28 as well as left/right buttons 28, an enter button 30, and two select buttons 32 to select a function which may be shown on the display 24 during use of the tool 10. The display 24 and all of the various buttons are disposed or otherwise attached to the housing 26. Accordingly, the tool 10 is designed to be a portable hand held unit. The size and shape of the tool 10 effectively enables the tool 10 to be transported from vehicle to vehicle. The tool 10 is not fixed to a particular location such as an automotive repair station. In other words, do it yourselfers are able to purchase the tool 10 for use at multiple sites such as their home, friend's home or at any other location.

The tool 10 which is illustrated in FIGS. 2-7 is capable of communicating with an on board diagnostic computer (OBD) of an automobile. Preferably, the OBD is a second generation OBD, namely OBD II. The communication between the OBD and the tool 10 may be accomplished by providing a connector (not shown) which is in electrical communication with the tool 10 and capable of connecting with an OBD connector located at the foot well on the driver's side of the automobile. The communication between the OBD and the tool 10 operates to support the six modes of the tool 10. In particular, the tool 10 may function to erase vehicle data, display diagnostic trouble codes, display freeze frame data, activate system tests, display enhanced information, and display live data. These modes/functions are not the only functions which the tool may be fabricated to perform but are only exemplary to assist in describing various other aspects of the present invention.

The erase mode functions to erase diagnostic trouble codes, freeze frame data, and reset the monitor status. In particular, the user depresses the erase mode button 12, and then the user is prompted twice to confirm that the above listed information is to be erased from the OBD. Thereafter, the DTCs, freeze frame data and monitor status are erased. The requirement that the user confirm twice that the information should be deleted is a requirement mandated by law. Accordingly, it is contemplated within the scope of the invention that the two confirmations may be eliminated or otherwise modified if the law mandating such confirming actions are modified or eliminated. In sum, the diagnostic trouble codes, freeze frame data and monitor status are erased with the push of a single button along and two confirmations that such information should be erased.

The display DTC mode functions to display DTCs stored on the vehicle's computer. This includes the display of a plurality of information items, such as troubled codes, pending codes and historical DTCs. An example of the information displayed on the display 24 when the display DTC button 14 is depressed is shown in FIG. 2. During use of the tool 10, the user depresses only the display DTC button 14, and without any further user intervention, the tool displays the DTC's stored on the vehicle's computer.

Figure 3:
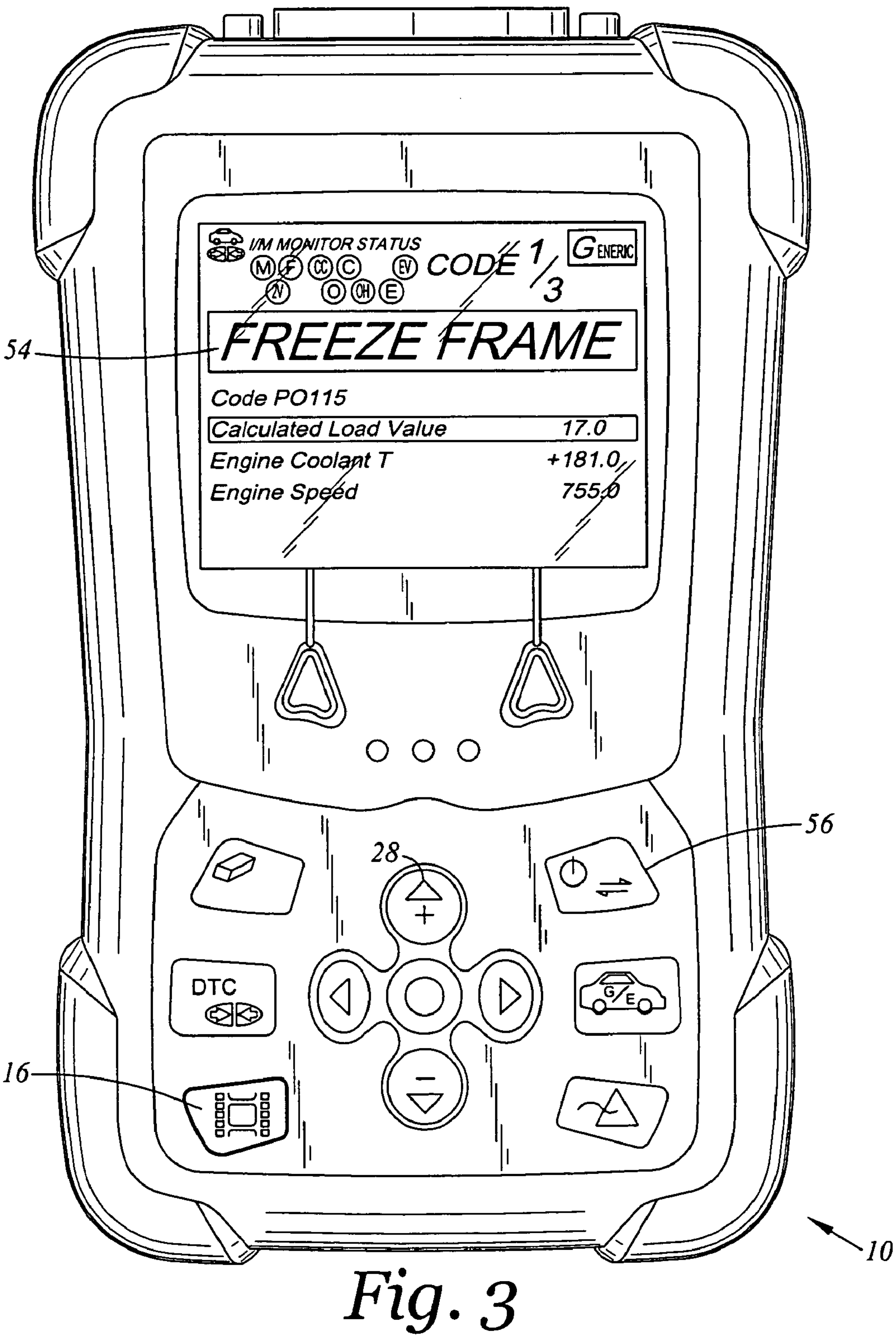
FIG. 3 is a front view of the present invention, namely the tool illustrating information shown on the display when the display Freeze Frame Data Button is depressed.

The display freeze frame data button 16 functions to display the DTCs which were stored at the time when the MIL status was turned on. An example of the information displayed on the display 24 when such button is depressed is shown in FIG. 3. During use of the tool 10, the user may depress only the display DTC button 16, and then without any further user intervention, the tool's display 24 displays the appropriate DTCs.

The activate system tests button 18 functions to allow the user to select from various information items or tests capable of being performed by the OBD. For example, the user may select from 02 sensor tests, non continuous tests and OBD controls. During use of the tool 10, the user may depress the activate system tests button 18 (see FIG. 2) and the user is provided three options, namely 1) run 02 sensor tests, 2) run non continuous tests, and 3) run OBD controls.

The display enhanced mode button 20 functions to display codes related to manufacturer specific parameter identifications. An example of the information displayed on the display 24 when such button 20 is depressed is shown in FIG. 4. As shown in FIG. 4, when such button 20 is depressed, the user is prompted to identify the year/make/model/engine (y/m/m/e) of the vehicle. During use of the tool 10, the user may depress the display enhanced mode button 20, and the tool 10 will proceed through a series of screens to identify the specific year, make, model and engine (y/m/m/e) of the automobile which the tool 10 is communication with. This is necessary to enable the tool 10 to determine and retrieve the additional information items e.g. PIDs which the manufacturer has added to the OBD. After determining the specific y/m/m/e of the automobile to which the tool 10 is communicating with, the tool 10 displays any diagnostic trouble codes which may have been faulted. In the alternative, the tool 10 may query the OBD to determine possible y/m/m/e of the vehicle the tool 10 is connected to such that the user need only confirm the correct choice. The tool may automatically display the vehicle information upon the depression of the enhanced mode button through an automatic request for vehicle information mode (Service Mode 9) if the vehicle supports this request.

The display live data button 22 functions to display operating conditions of the automobile as the automobile is running. An example of the information displayed on the display 24 when such button 22 is depressed is shown in FIG. 5. During use of the tool 10, the user may depress the display live data button 22, and the tool 10 may automatically record a pre determined set of PIDs. In the alternative, the tool 10 may record a user selected set of PIDs.

For the purposes of illustrating the ingenuity of the present invention, each of the modes listed above may be viewed as being part of a different sub menu. For example, the erase function button 12 is associated with a submenu that relates to erasing information and the display DTCs button 14 is associated with a submenu that relates to displaying DTCs, and likewise with the other mode buttons. In this regard, the user may exit and enter different modes by simply depressing the desired mode button. For example, the user may currently be within the erasing submenu and confirmed erase once. As discussed in the background of the invention, at this point, in the prior art scan tools, if the user wanted to exit the erase submenu/mode and enter the display DTCs submenu/mode, then the user would have to back out of the erase submenu until the user is at a top level menu. At which point, the user may enter the display DTCs submenu. In contrast, in the present invention, the user while in the middle of the erasing submenu may simply press the display DTCs button 14 to exit the erasing submenu (i.e., erasing mode) and enter the display DTCs submenu (i.e., display DTC mode).

Moreover, when the user switches between modes, the prior screen which the user switched from is saved such that the prior screen is displayed when the user returns. For example, when the display DTC button 14 is depressed, the display displays information as is shown in FIG. 2. Thereafter, when the display Freeze Frame Data button 16 is depressed, the display displays information as shown in FIG. 3. Now, if the user depresses the display DTC button 14 to return to the display DTC mode, then the display 24 may display information as shown in FIG. 2 without any further user intervention. In the alternative, the display 24 may be redirected to the top of the submenu.

The tool's ability to switch between modes even though it is within a mode may be due to the location of the button 12, 14, 16, 18, 20, 22. In particular, the buttons 12, 14, 16, 18, 20, 22 are located on an exterior surface 56 of the tool 10 such that even though the tool 10 has entered a mode, the buttons 12, 14, 16, 18, 20, 22 are still accessible to the user and active. In this regard, the user is able to depress a desired button 12, 14, 16, 18, 20, 22 to exit from a current mode and enter the desired mode. In the alternative, the buttons 12, 14, 16, 18, 20, 22 may be programmed onto a touch screen display 24. The tool 10 when entering a mode may overlay the buttons 12, 14, 16, 18, 20, 22 with the mode information. As such, at this point in time, the buttons 12, 14, 16, 18, 20, 22 are not visible by the operators. However, the user may be provided with a "home" button (not shown) to recall all of the buttons 12, 14, 16, 18, 20, 22 such that a desired button may be depressed (i.e., exit the current mode and enter the desired mode).

The display 24 of the tool is shown in FIG. 4. The display 24 displays a set of icons 34, 36, 38, 40 and information pertinent to the OBD. In particular, the display 24 displays disparate information on a single screen. For example, an upper left hand portion of the display 24 has four different icons 34, 36, 38, 40, namely the vehicle icon 34, link icon 36, computer icon 38 and the battery icon 40. The vehicle icon 34 indicates whether the tool 10 is being properly powered to the vehicle's OBD connector. The link icon 36 indicates whether the tool 10 is communicating (i.e., linked) with the vehicle's on-board computer. The computer icon 38 indicates whether the tool 10 is optionally connected to a computer. The battery icon 40 indicates the status of the tool's internal battery.

To the right of the four icons 34, 36, 38, 40 (see FIG. 4) discussed above, the I/M monitor statuses are displayed via indicators 42. The monitors may be categorized into two different categories, namely continuous and non-continuous. The continuous monitors may be comprehensive component monitor, misfire monitor, and fuel system monitor. The non continuous monitors may be oxygen sensor monitor, oxygen sensor heater monitor, catalyst monitor, heated catalyst monitor, heated catalyst monitor, EGR system monitor and EVAP system monitor. The monitors which are supported and performed may be indicated by providing a solid non blinking indicator 42. The monitors which are supported and not yet performed may be indicated by providing a blinking indicator 42. The monitors which are not supported may be indicated by elimination of the corresponding indicator(s) 42.

To the right of the I/M monitor statuses, a "PENDING" indicator 44 (see FIG. 4) indicates if the displayed DTC is a pending code. A "CODE" indicator 46 identifies the code number sequence. For example, in FIG. 4, the first DTC of three DTCs is being viewed. The "MIL" indicator 48 indicates whether the malfunction indicator lamp is on or off. The HISTORY indicator 50 indicates whether the displayed DTC is a faulted DTC when the MIL was triggered. At the upper right hand corner of the display 24, the generic/enhanced indicator 52 indicates whether the tool 10 is retrieving generic or enhanced information.

On the display 24 (see FIG. 4), immediately below the indicators 42, 44, 46, 48, 50, 52, the mode title 54 is displayed. In particular, if a mode button 12, 14, 16, 18, 20, 22 is depressed then an appropriate mode title 54 may be displayed. For example, depressing the erase button 12 will display a ERASE mode title, depressing the display DTC button 14 (see FIG. 2) will display a DTC CODE mode title 54 (see FIG. 2), depressing the display freeze frame data button 16 (see FIG. 3) will display a FREEZE FRAME mode title 54 (see FIG. 3), depressing the activate system tests button 18 will display a SYSTEM TEST mode title 54, depressing the display enhanced mode button 20 (see FIG. 4) will display a CAR SELECTION mode title 54 and the enhanced indicator 52 in the upper right hand corner of the display 24 will additionally be illuminated, and depressing the display live data button 22 will display a LIVE DATA mode title 54, as shown in FIG. 5.

Further, on the display, immediately below the mode title 54 (see FIG. 2), appropriate information related to the mode is displayed. For example, when the user is in the display DTC mode, then a list of faulted DTCs may be displayed on the display 24. This list of the DTCs along with the indicators 42, 44, 46, 48, 50, 52 and icons 34, 36, 38, 40 discussed above are provided on a single screen which informs the user (e.g., mechanic) of the relevant information. Furthermore, the indicators 42, 44, 46, 48, 50, 52 and icons 34, 36, 38, 40 are displayed whenever the tool 10 is connected or otherwise communicable with the automobile. In other words, when the user connects the tool 10 to the automobile, the tool 10 will proceed without any further user intervention to determine the vehicle y/m/m/e, faulted DTCs as well as any other information immediately available upon hookup and that is relevant to the above listed indicators 42, 44, 46, 48, 50, 52 and icons 34, 36, 38, 40 (i.e., start up mode). For each of the above listed modes, appropriate information may be displayed immediately below the mode title 54. In this regard, the tool 10 is innovative in that it displays MIL status, DLC status, monitor status, I/M Readiness status, DTC status stored, pending or historical and number of codes on one screen within 15 seconds of connecting the tool to the automobile.

In another aspect of the present invention, three (3) light emitting diodes 58, 60, 62 (LED) may be integrated into the scan tool 10 at a lower portion thereof, as shown more particularly in FIG. 6. These light emitting diodes 58, 60, 62 may be operative to indicate to the user the status of the vehicle. The first LED 58 may be associated with a red color and may indicate a failed status of the vehicle, the second LED 60 may be associated with a yellow color and may indicate an inconclusive status of the vehicle, and the third LED 62 may be associated with a green color and may indicate a passed status of the vehicle. The passed/inconclusive statuses of the vehicle may be determined from diagnostic trouble codes stored on the vehicles computer (OBD). In the alternative, the three LEDs 58, 60, 62 may be a single multi-colored light which accomplishes the same function as the three LEDs 58, 60, 62.

More particularly, the green LED may indicate that all engine systems are "OK" and operating normally. Further, the green LED may indicate that all monitors supported by the vehicle have run and performed their diagnostic testing, and no trouble codes are present. Lastly, a zero may be shown on the scan tool's LCD display, and all Monitor icons may be solid. The yellow LED may indicate one of the following conditions. First, A PENDING CODE IS PRESENT—If the yellow LED is illuminated, it may indicate a Pending code is present. As such, the scan tool's LCD display should be checked for confirmation. In this regard, a pending code is confirmed by the presence of a numeric code and the word PENDING on the scan tool's LCD display. Second, MONITOR NOT RUN STATUS—If the Code Reader's LCD display shows a zero (indicating there are no DTC's present in the vehicle's computer memory), but the yellow LED is illuminated, it may be an indication that some of the Monitors supported by the vehicle have not yet run and completed their diagnostic testing. As such, the scan tool's LCD display should be checked for confirmation. In particular, all Monitor icons that are blinking have not yet run and completed their diagnostic testing; all Monitor icons that are solid have run and completed their diagnostic testing. The red LED may indicate that there is a problem with one or more of the vehicle's systems. The red LED may also be used to indicate that DTC(s) are present (displayed on the scan tool's screen). In this case, the Multifunction Indicator (Check Engine) lamp on the vehicle's instrument panel will be illuminated.

Figure 8:
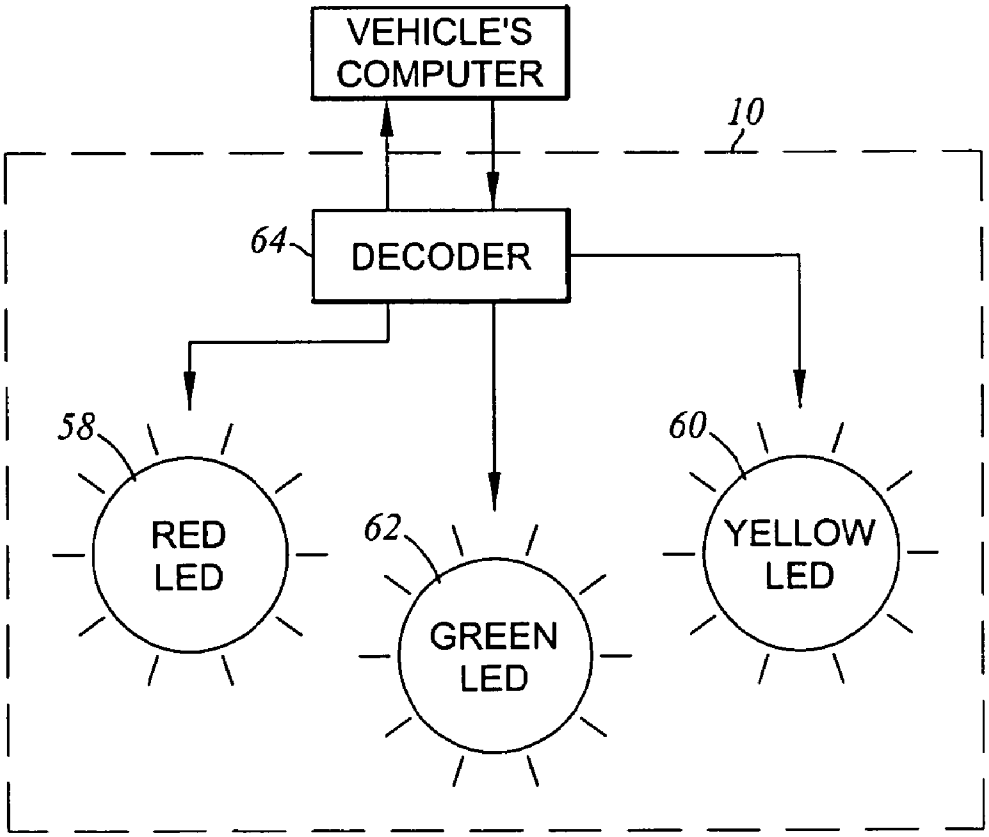
FIG. 8 is a circuit diagram of three LEDs shown in FIG. 6.

The three LEDs 58, 60, 62 may be a quick and easy method of communicating to the user whether further diagnosis of the vehicle is required. For example, first, the scan tool may be physically connected to the vehicle's computer connector or a communication link between scan tool and vehicle's computer may otherwise be established. Immediately upon physical connection of the scan tool to the vehicle's computer connector or otherwise establishing the communication link, information stored on the vehicle's computer may be communicated to a scan tool decoder 64. The information may be diagnostic trouble codes (DTC), pending codes, information on whether MIL has been commanded on or off, and/or information on whether all Monitors are complete or incomplete (i.e. I/M status). And, based on the communicated information, one of the three LEDs 58, 60, 62 may be illuminated, as shown in FIG. 8.

Generally, if the green LED 62 is illuminated, then the user of the scan tool 10 does not have to interpret the data displayed on the display 24. Rather, the user may disconnect the scan tool 10 from the vehicle's computer and may be rest assured that the vehicle has a passed status. In contrast, if the yellow or red LEDs 60, 62 were to be illuminated, then the user is immediately notified that further diagnosis of the vehicle is required. At this point, the user may interpret the information displayed on the display 24 to determine the particular reasons for the inconclusive status or failed status of the vehicle. This type of immediate notification of the status of the vehicle may be performed immediately upon physically connecting or establishing a communication link between the scan tool and the vehicle's computer and without any further user intervention. The operation of these three LEDs may be included in the start-up mode. In particular, the three LEDs 58, 60, 62 are illuminated based on the information as communicated to the scan tool from the vehicle's computer in accordance with the table illustrated in FIG. 9.

This description of the various aspects of the present invention is presented to illustrate the preferred embodiments of the present invention, and other inventive concepts may be otherwise variously embodied and employed. The appended claims are intended to be construed to include such variations except insofar as limited by the prior art.

What is claimed is:

1. A method for retrieving and displaying relevant data on operating conditions of a vehicle from a vehicle's computer using a scan tool, the method comprising the steps of:

a) providing a data structure having a first level and a second level, the first level including a plurality of category headings and the second level including separately accessible underlying vehicle information segregated by categories of vehicle information associated with the respective category heading;

b) selecting a first category heading from the first level on the scan tool from the plurality of category headings by selecting a first button corresponding to the first category heading;

c) retrieving and displaying second level vehicle information associated with the first category heading from the vehicle's computer on the scan tool, the retrieving and displaying second level vehicle information associated with the first category heading step being implemented in response to selection of the first button;

d) selecting a second category heading from the first level on the scan tool from the plurality of category headings by selecting a second button corresponding to the second category heading;

e) retrieving and displaying second level vehicle information associated with the second category heading from the vehicle's computer on the scan tool, the retrieving and displaying second level vehicle information associated with the second category heading step being implemented in response to selection of the second button; and f) switching from displaying on the scan tool second level information associated with the first category heading to displaying on the scan tool second level information associated with the second category heading by selecting the second button independent of a need for any further user intervention.

2. The method of claim 1 further comprising the step of retrieving and displaying second level information associated with a third category heading from the vehicle's computer on the scan tool, the retrieving and displaying second level information associated with the third category heading being implemented in response to selection of a third button associated with the third category heading without any further user intervention.

3. The method of claim 2 wherein the second level information associated with the third category heading includes a set of data is representative of monitor status information stored in an on board diagnostic system.

4. The method of claim 1 wherein the second level information associated with the first category heading includes a set of data representative of pending codes and diagnostic trouble codes stored in an on board diagnostic system.

5. The method of claim 1 wherein the second level information associated with the second category heading includes a set of data is representative of freeze frame data stored in an on board diagnostic system.

6. The method of claim 1 further comprising the step of saving the displayed second level information associated with the first category heading on the scan tool.

7. The method of claim 6 further comprising the step of switching from the second level information associated with the second category heading on the scan tool to the second level information associated with the first category heading on the scan tool by selecting the button corresponding to the first category heading independent of a need for any further user intervention.

8. The method of claim 7 further comprising the step of recalling and displaying the saved second level information associated with the first category heading in response to switching from the second level information associated with the second category heading to the second level information associated with the first category heading.

9. The method of claim 1 wherein the second level information associated with the first category heading includes a set of data representative of a diagnostic trouble code (DTC) and the second level information associated with the second category heading includes a set of data that is representative of freeze frame data.

10. The method of claim 1 wherein the step of switching from the second level information associated with the first category heading to the second level information associated with the second category heading is achieved independent of any user input to a visual interface.

11. The method of claim 1 wherein each button is associated with a different set of automotive diagnostic data.

12. The method of claim 1, further comprising the step of accessing vehicle identification information and displaying vehicle specific information items in response to selecting the first button.

13. The method of claim 12 further comprising the step of automatically generating a communication protocol and request for data associated with the second category heading in response to selecting the second button.

14. The method of claim 1, wherein the step of selecting first and second buttons is implemented by user interaction with a touch screen display.

15. The method of claim 1 wherein the step of retrieving and displaying the second level information associated with the first category heading comprises retrieving and displaying on a scan tool a first submenu comprising a plurality of information items relating to a first vehicle system.

16. The method as recited in claim 15 further comprising the step of selecting and displaying on a scan tool one of the information items from the first submenu.

17. The method as recited in claim 16 further comprising the step of storing the selected information item in response to selecting the button corresponding to the second category heading.

18. The method of claim 17 further comprising the step of switching from displaying the second level information associated with the second category heading to displaying the selected information item by selecting the first button, independent of further user intervention.

19. The method as recited in claim 1 wherein the steps of selecting the first button is operative to retrieve vehicle identifying information and a plurality of vehicle specific data items from the vehicle on board computer.

20. The method as recited in claim 1 wherein the second level information associated with the first category heading consists of a first submenu associated with a first vehicle operating condition, the first submenu including information representative of the first vehicle operating condition.

21. The method as recited in claim 1 wherein the second level information associated with the first category heading includes a set of vehicle specific information items, wherein step b) includes determining vehicle identification data to enable access to the set of vehicle specific information items from the vehicle's computer.

22. The method as recited in claim 1 wherein at least one of the first and second buttons is located on a touch screen.

23. The method recited in claim 1, further comprising the step of concurrently displaying the first level category headings and the second level vehicle information associated with the first category heading.

24. The method recited in claim 1, further comprising the step of providing the first and second buttons, the first and second buttons being visually perceivable during display of the second level data, the step of switching from displaying on the scan tool second level information associated with the first category heading to displaying on the scan tool second level information associated with the second category heading consisting essentially of selecting the second button.

25. The method of claim 1, wherein the switching step is performed independent of displaying an intermediate screen between displaying the second level information associated with the first category heading and displaying the second level information associated with the second category heading.

26. The method of claim 1, wherein the switching step is performed independent of navigating to a menu display screen.

27. The method of claim 1, wherein the first and second buttons are perceivable and actuatable during display of the second level vehicle information.

28. A method retrieving relevant data on operating conditions of a vehicle from a vehicle's computer using a scan tool, the method comprising the steps of:

a) providing a data structure having a first level and a second level, the first level including a plurality of category headings and the second level including underlying vehicle information associated with the respective category heading, the second level information being segregated by categories of vehicle information, each category of vehicle information being separately accessible in response to selecting a button corresponding to the respective category heading;

b) downloading diagnostic trouble codes from the vehicle's computer to the scan tool;

c) generating a visual output signal in the handheld scan tool, the visual output being representative of passed/failed/inconclusive status of the vehicle as determined from the downloaded diagnostic trouble codes;

d) wherein the visual outputs being representative of passed/failed/inconclusive status consists essentially of a green light, red light, and yellow light, respectively.

29. The method of claim 28 wherein step c) includes analyzing at least two of Ignition status, DTC status, MIL status, and I/M status.

30. The method of claim 28 wherein step b) includes downloading codes related to manufacturer specific parameter identifications.

31. The method of claim 30 wherein the year, make, category heading, and engine of the vehicle are identified to access the manufacturer specific parameter identifications.

32. The method as recited in claim 28 further comprising the step of displaying vehicle year, make, category heading, engine and at least one of ignition status and malfunction indicator lamp status in response to connecting the scan tool to the vehicle's computer.

33. The method of claim 32 further comprising the steps of:

g) selecting a second category heading category heading from the first level on the scan tool from the plurality of category headings by selecting a second button corresponding to the second category heading;

h) retrieving and displaying second level vehicle information associated with the second category heading from the vehicle's computer on the scan tool, the retrieving and displaying second level vehicle information associated with the second category heading step being implemented in response to selection of the second button; and i) switching from displaying on the scan tool second level information associated with the first category heading to displaying on the scan tool second level information associated with the second category heading by selecting the second button independent of any further user intervention.

34. A method for assisting a user in retrieving relevant data on operating conditions of a vehicle from a vehicle's computer using a scan tool, the method comprising the steps of:

a) connecting the scan tool to the vehicle's computer;

b) downloading diagnostic trouble codes from the vehicle's computer to the scan tool;

c) generating a visual output signal in the handheld scan tool, the visual output being representative of passed/failed/inconclusive status of the vehicle as determined from the downloaded diagnostic trouble codes, wherein the visual outputs being representative of passed/failed/inconclusive status consists essentially of a green light, red light, and yellow light, respectively;

d) providing a data structure having a first level and a second level, the first level having a plurality of category headings and the second level including underlying vehicle information associated with the respective category headings;

e) selecting a first category heading from the first level on the scan tool by selecting a first button corresponding to the first category heading; and f) retrieving and displaying second level vehicle information associated with the first category heading from the vehicle's computer on the scan tool, the retrieving and displaying second level vehicle information associated with the first category heading step being implemented in response to selection of the first button.

35. A method for retrieving and displaying relevant data on operating conditions of a vehicle from a vehicle's computer using a scan tool, the method comprising the steps of:

a) providing a data classification scheme including several data groups, each data group including underlying group data;

b) selecting a first data group on the scan tool by selecting a first button corresponding to the first data group;

c) retrieving and displaying first group data associated with the first data group from the vehicle's computer on the scan tool, the retrieving and displaying first group data being implemented in response to selection of the first button;

d) selecting a second data group on the scan tool by selecting a second button corresponding to the second data group;

e) retrieving and displaying second group data associated with the second data group from the vehicle's computer on the scan tool, the retrieving and displaying second group data being implemented in response to selection of the second button; and f) switching from displaying on the scan tool first group data to displaying on the scan tool second group data by selecting the second button independent of any need for further user input.

36. The method recited in claim 35, wherein the several data groups include diagnostic trouble codes, mil status, freeze frame data, and live data.

* * * * *